(12) United States Patent
Reichelt et al.

(10) Patent No.: US 7,813,826 B2
(45) Date of Patent: Oct. 12, 2010

(54) APPARATUS AND METHOD FOR STORING AUDIO FILES

(75) Inventors: Katrin Reichelt, Dresden (DE); Gabriel Gatzsche, Martinroeda (DE); Sandra Brix, Ilmenau (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 613 days.

(21) Appl. No.: 11/837,109

(22) Filed: Aug. 10, 2007

(65) Prior Publication Data
US 2008/0074775 A1 Mar. 27, 2008

Related U.S. Application Data

(63) Continuation of application No. PCT/EP2006/001416, filed on Feb. 16, 2006.

(30) Foreign Application Priority Data
Feb. 23, 2005 (DE) .................. 10 2005 008 342

(51) Int. Cl.
*G06F 17/00* (2006.01)
*G05B 13/02* (2006.01)
*H04R 29/00* (2006.01)
*G06F 3/00* (2006.01)
*G06F 5/00* (2006.01)

(52) U.S. Cl. ............... 700/94; 700/32; 381/58; 710/40

(58) Field of Classification Search ............ 700/13–14, 700/28, 32–33, 94; 381/17–18, 58, 182; 710/40, 43, 72, 74
See application file for complete search history.

(56) References Cited

U.S. PATENT DOCUMENTS

| 6,572,475 | B1 | 6/2003 | Okabe et al. |
| 7,027,600 | B1 | 4/2006 | Kaji et al. |
| 2001/0012368 | A1 | 8/2001 | Yamazaki |
| 2005/0175197 | A1 | 8/2005 | Melchior et al. |
| 2006/0092854 | A1 | 5/2006 | Roder et al. |
| 2006/0098830 | A1 | 5/2006 | Roeder et al. |
| 2006/0109992 | A1 | 5/2006 | Roeder et al. |

FOREIGN PATENT DOCUMENTS

JP 07-303148 A 11/1995

(Continued)

OTHER PUBLICATIONS

Scheirer et al., "Audiobifs: Describing Audio Scenes With the MPEG-4 Multimedia Standard," IEEE Transactions on Multimedia, vol. 1, No. 3, Sep. 1999, pp. 237-250.

(Continued)

*Primary Examiner*—Curtis Kuntz
*Assistant Examiner*—Jesse A Elbin
(74) *Attorney, Agent, or Firm*—Keating & Bennett, LLP

(57) ABSTRACT

Audio files for an audio piece are stored in cross-scene optimized manner, so that when reading out audio files for a scene entailing high utilization of a wave field synthesis system, very short memory access times are achieved, whereas for scenes not entailing such a high utilization of the wave field synthesis system, longer memory access times in turn are accepted.

14 Claims, 6 Drawing Sheets

FOREIGN PATENT DOCUMENTS

| JP | 10-211358 A | 8/1998 |
|---|---|---|
| JP | 11-027800 A | 1/1999 |
| JP | 2000-267675 A | 9/2000 |
| JP | 2002-199500 A | 7/2002 |
| JP | 2003-284196 A | 10/2003 |
| JP | 2004-007211 A | 1/2004 |
| JP | 2004-258765 A | 9/2004 |
| WO | 2004/036955 A1 | 4/2004 |
| WO | 2004/051624 A2 | 6/2004 |
| WO | 2004/103022 A2 | 11/2004 |
| WO | 2004/103024 A1 | 11/2004 |
| WO | 2004/114725 A1 | 12/2004 |

OTHER PUBLICATIONS

Official communication issued in the counterpart International Application No. PCT/EP2006/001416, mailed on Feb. 16, 2006.

Heimrich et al.; "Verwaltung Spatio-Temporaler Audiodaten Fur Die Wellenfeldsynthese," Mar. 3, 2005.

Schroder et al.; "Effiziente Uberprufung Von Ausgabebedingungen in Einem Multimedia—Datenbanksystem," May 23, 2005.

Halvorsen et al.; "Storage System Support for Multimedia Applications," Research Report No. 307, Department of Informatics, University of Oslo, Norway; Jun. 1, 2003.

Heimrich; "Modeling of Output Contraints in Multimedia Database Systems," Proceedings of the 11th International Multimedia Modelling Conference, IEEE, Jan. 2-14, 2005.

Yu et al.; "Efficient Placement of Audio Data on Optical Disks for Real-Time Applications," Communications of the ACM, vol. 32 No. 7, Jul. 1989, New York, U.S., pp. 862-871.

Watkins et al.; "Storing Continuous Media Objects Using Parallelism With Merging," College of Computing, Georgia Institute of Technology, pp. 339-345; Aug. 9, 1995.

Sporer; "Wave Field Synthesis- Generation and Reproduction of Natural Sound Environments," Fraunhofer Institute for Digial Media Technology, pp. 133-138, Oct. 5, 2004.

Rangan et al.; "Efficient Storage Techniques for Digital Continuous Multimedia," vol. 5, No. 4, Aug. 1993.

Berkhout et al.; "Acoustic Control by Wave Field Synthesis," Journal of the Acoustical Society of America, AIP/Acoustical Society of America, vol. 93, No. 5, pp. 2764-2778; NY, US; May 1993.

Melchior; "Authoring System for Wave Field Synthesis Content Production," AES Convention Paper 5972, 115th Convention, AES Meeting; Oct. 10-13, 2003; pp. 1-10.

Reichelt et al., "Apparatus and Method for Controlling a Wave Field Synthesis Renderer Means With Audio Objects," U.S. Appl. No. 11/837,099, filed Aug. 10, 2007.

Reichelt et al., "Apparatus and Method for Simulating a Wave Field Synthesis System," U.S. Appl. No. 11/837,105, filed Aug. 10, 2007.

Reichelt et al., "Apparatus and Method for Controlling a Wave Field Synthesis Rendering Means," U.S. Appl. No. 11/840,327, filed Aug. 17, 2007.

Reichelt et al., "Apparatus and Method for Providing Data in a Multi-Renderer System," U.S. Appl. No. 11/840,333, filed Aug. 17, 2007.

English Translation of official communication issued in counterpart German Application No. 10 2005 008 342.0, mailed on Oct. 30, 2006.

Office Action issued in U.S. Appl. No. 11/837,099, mailed on Oct. 22, 2009.

Seo et al., "Implementation of Interactive 3D Audio Using MPEG-4 Multimedia Standards," Oct. 2003, Audio Engineering Society, Convention Paper 5980, pp. 1-6.

Official Communication issued in corresponding Japanese Patent Application No. 2007-556536, mailed on Jun. 29, 2010.

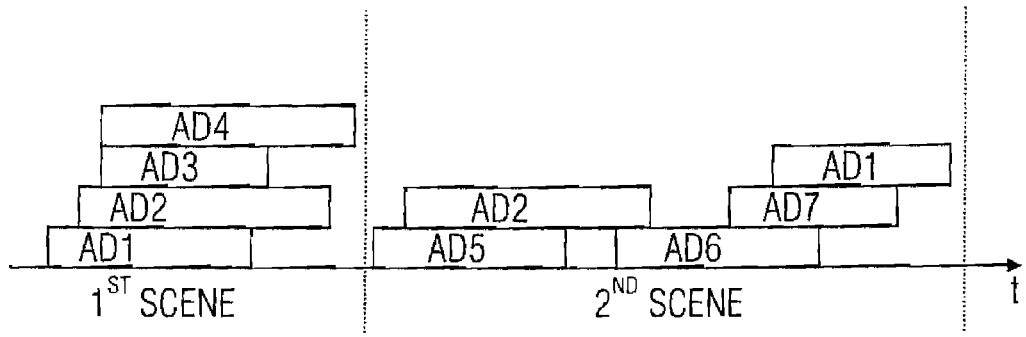
FIGURE 1B
FOR 1ST SCENE: AD1: DISK 1
FOR 2ND SCENE: AD7: DISK 1
(1ST SCENE HAS PRIORITY)
| AD1 | AD2 | AD7 | | DISK 1
| AD3 | AD4 | AD5 | AD6 | | DISK 2
FIGURE 1C
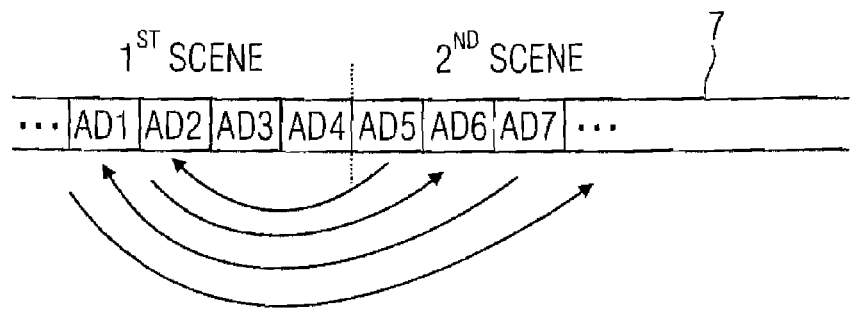
FIGURE 1D

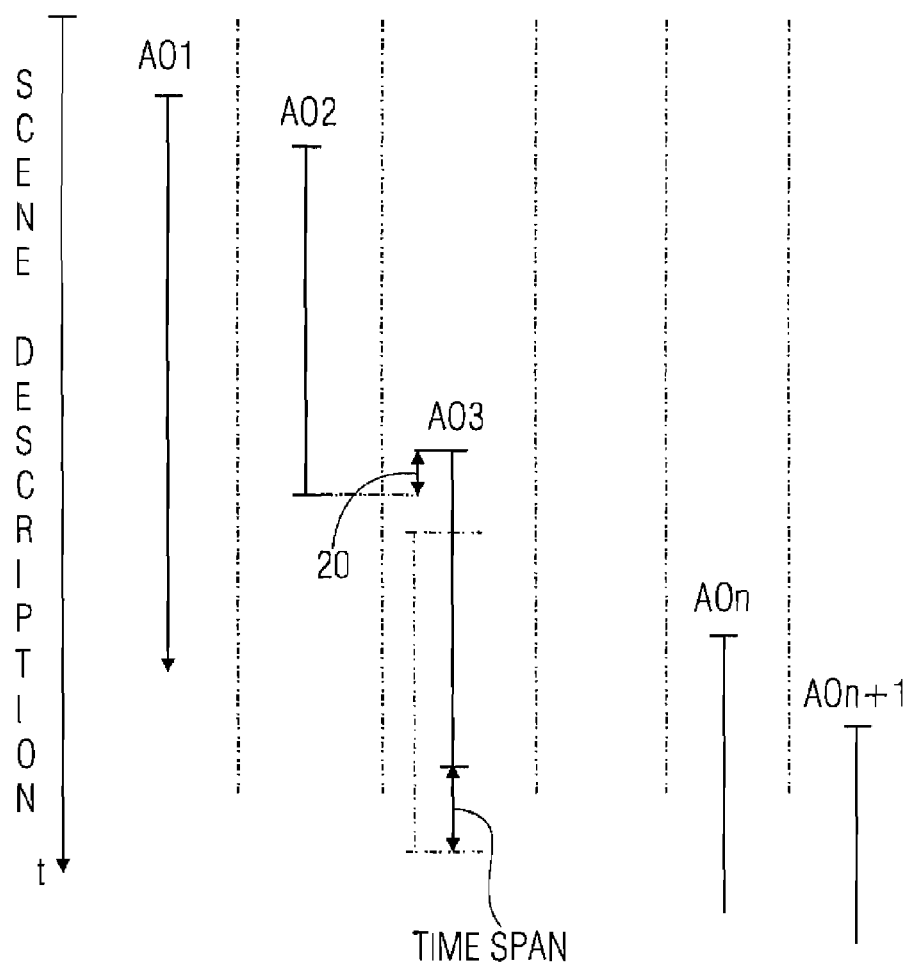

APPARATUS AND METHOD FOR STORING AUDIO FILES

CROSS-REFERENCE TO RELATED APPLICATIONS

This application is a continuation of copending International Application No. PCT/EP2006/001416, filed Feb. 16, 2006, which designated the United States and was not published in English.

BACKGROUND OF THE INVENTION

1. Field of the Invention

The present invention relates to the field of wave field synthesis, and particularly to the control of a wave field synthesis rendering means with data to be processed.

The present invention relates to wave field synthesis concepts, and particularly to an efficient wave field synthesis concept in connection with a multi-renderer system.

2. Description of the Related Art

There is an increasing need for new technologies and innovative products in the area of entertainment electronics. It is an important prerequisite for the success of new multimedia systems to offer optimal functionalities or capabilities. This is achieved by the employment of digital technologies and, in particular, computer technology. Examples for this are the applications offering an enhanced close-to-reality audiovisual impression. In previous audio systems, a substantial disadvantage lies in the quality of the spatial sound reproduction of natural, but also of virtual environments.

Methods of multi-channel loudspeaker reproduction of audio signals have been known and standardized for many years. All usual techniques have the disadvantage that both the site of the loudspeakers and the position of the listener are already impressed on the transmission format. With wrong arrangement of the loudspeakers with reference to the listener, the audio quality suffers significantly. Optimal sound is only possible in a small area of the reproduction space, the so-called sweet spot.

A better natural spatial impression as well as greater enclosure or envelope in the audio reproduction may be achieved with the aid of a new technology. The principles of this technology, the so-called wave field synthesis (WFS), have been studied at the TU Delft and first presented in the late 80s (Berkout, A. J.; de Vries, D.; Vogel, P.: Acoustic control by Wave field Synthesis. JASA 93, 1993).

Due to this method's enormous demands on computer power and transfer rates, the wave field synthesis has up to now only rarely been employed in practice. Only the progress in the area of the microprocessor technology and the audio encoding do permit the employment of this technology in concrete applications today. First products in the professional area are expected next year. In a few years, first wave field synthesis applications for the consumer area are also supposed to come on the market.

The basic idea of WFS is based on the application of Huygens' principle of the wave theory:

Each point caught by a wave is starting point of an elementary wave propagating in spherical or circular manner.

Applied on acoustics, every arbitrary shape of an incoming wave front may be replicated by a large amount of loudspeakers arranged next to each other (a so-called loudspeaker array). In the simplest case, a single point source to be reproduced and a linear arrangement of the loudspeakers, the audio signals of each loudspeaker have to be fed with a time delay and amplitude scaling so that the radiating sound fields of the individual loudspeakers overlay correctly. With several sound sources, for each source the contribution to each loudspeaker is calculated separately and the resulting signals are added. If the sources to be reproduced are in a room with reflecting walls, reflections also have to be reproduced via the loudspeaker array as additional sources. Thus, the expenditure in the calculation strongly depends on the number of sound sources, the reflection properties of the recording room, and the number of loudspeakers.

In particular, the advantage of this technique is that a natural spatial sound impression across a great area of the reproduction space is possible. In contrast to the known techniques, direction and distance of sound sources are reproduced in a very exact manner. To a limited degree, virtual sound sources may even be positioned between the real loudspeaker array and the listener.

Although the wave field synthesis functions well for environments the properties of which are known, irregularities occur if the property changes or the wave field synthesis is executed on the basis of an environment property not matching the actual property of the environment.

A property of the surrounding may also be described by the impulse response of the surrounding.

This will be set forth in greater detail on the basis of the subsequent example. It is assumed that a loudspeaker sends out a sound signal against a wall, the reflection of which is undesired. For this simple example, the space compensation using the wave field synthesis would consist in the fact that at first the reflection of this wall is determined in order to ascertain when a sound signal having been reflected from the wall again arrives the loudspeaker, and which amplitude this reflected sound signal has. If the reflection from this wall is undesirable, there is the possibility, with the wave field synthesis, to eliminate the reflection from this wall by impressing a signal with corresponding amplitude and of opposite phase to the reflection signal on the loudspeaker, so that the propagating compensation wave cancels out the reflection wave, such that the reflection from this wall is eliminated in the surrounding considered. This may be done by at first calculating the impulse response of the surrounding and then determining the property and position of the wall on the basis of the impulse response of this surrounding, wherein the wall is interpreted as a mirror source, i.e. as a sound source reflecting incident sound.

If at first the impulse response of this surrounding is measured and then the compensation signal, which has to be impressed on the loudspeaker in a manner superimposed on the audio signal, is calculated, cancellation of the reflection from this wall will take place, such that a listener in this surrounding has the sound impression that this wall does not exist at all.

However, it is crucial for optimum compensation of the reflected wave that the impulse response of the room is determined accurately so that no over- or undercompensation occurs.

Thus, the wave field synthesis allows for correct mapping of virtual sound sources across a large reproduction area. At the same time it offers, to the sound master and sound engineer, new technical and creative potential in the creation of even complex sound landscapes. The wave field synthesis (WFS, or also sound field synthesis), as developed at the TU Delft at the end of the 80s, represents a holographic approach of the sound reproduction. The Kirchhoff-Helmholtz integral serves as a basis for this. It states that arbitrary sound fields within a closed volume can be generated by means of a distribution of monopole and dipole sound sources (loudspeaker arrays) on the surface of this volume.

In the wave field synthesis, a synthesis signal for each loudspeaker of the loudspeaker array is calculated from an audio signal sending out a virtual source at a virtual position, wherein the synthesis signals are formed with respect to amplitude and phase such that a wave resulting from the superposition of the individual sound wave output by the loudspeakers present in the loudspeaker array corresponds to the wave that would be due to the virtual source at the virtual position if this virtual source at the virtual position were a real source with a real position.

Typically, several virtual sources are present at various virtual positions. The calculation of the synthesis signals is performed for each virtual source at each virtual position, so that typically one virtual source results in synthesis signals for several loudspeakers. As viewed from a loudspeaker, this loudspeaker thus receives several synthesis signals, which go back to various virtual sources. A superposition of these sources, which is possible due to the linear superposition principle, then results in the reproduction signal actually sent out from the loudspeaker.

The possibilities of the wave field synthesis can be utilized the better, the larger the loudspeaker arrays are, i.e. the more individual loudspeakers are provided. With this, however, the computation power the wave field synthesis unit must summon also increases, since channel information typically also has to be taken into account. In detail, this means that, in principle, a transmission channel of its own is present from each virtual source to each loudspeaker, and that, in principle, it may be the case that each virtual source leads to a synthesis signal for each loudspeaker, and/or that each loudspeaker obtains a number of synthesis signals equal to the number of virtual sources.

If the possibilities of the wave field synthesis particularly in movie theatre applications are to be utilized in that the virtual sources can also be movable, it can be seen that rather significant computation powers are to be handled due to the calculation of the synthesis signals, the calculation of the channel information and the generation of the reproduction signals through combination of the channel information and the synthesis signals.

Furthermore, it is to be noted at this point that the quality of the audio reproduction increases with the number of loudspeakers made available. This means that the audio reproduction quality becomes the better and more realistic, the more loudspeakers are present in the loudspeaker array(s).

In the above scenario, the completely rendered and analog-digital-converted reproduction signal for the individual loudspeakers could, for example, be transmitted from the wave field synthesis central unit to the individual loudspeakers via two-wire lines. This would indeed have the advantage that it is almost ensured that all loudspeakers work synchronously, so that no further measures would be needed for synchronization purposes here. On the other hand, the wave field synthesis central unit could be produced only for a particular reproduction room or for reproduction with a fixed number of loudspeakers. This means that, for each reproduction room, a wave field synthesis central unit of its own would have to be fabricated, which has to perform a significant measure of computation power, since the computation of the audio reproduction signals must take place at least partially in parallel and in real time, particularly with respect to many loudspeakers and/or many virtual sources.

German patent DE 10254404 B4 discloses a system as illustrated in FIG. 7. One part is the central wave field synthesis module 10. The other part consists of individual loudspeaker modules 12a, 12b, 12c, 12d, 12e, which are connected to actual physical loudspeakers 14a, 14b, 14c, 14d, 14e, such as it is shown in FIGS. 1A-1D. It is to be noted that the number of the loudspeakers 14a-14e lies in the range above 50 and typically even significantly above 100 in typical applications. If a loudspeaker of its own is associated with each loudspeaker, the corresponding number of loudspeaker modules also is needed. Depending on the application, however, it is preferred to address a small group of adjoining loudspeakers from a loudspeaker module. In this connection, it is arbitrary whether a loudspeaker module connected to four loudspeakers, for example, feeds the four loudspeakers with the same reproduction signal, or corresponding different synthesis signals are calculated for the four loudspeakers, so that such a loudspeaker module actually consists of several individual loudspeaker modules, which are, however, summarized physically in one unit.

Between the wave field synthesis module 10 and every individual loudspeaker 12a-12e, there is a transmission path 16a-16e of its own, with each transmission path being coupled to the central wave field synthesis module and a loudspeaker module of its own.

A serial transmission format providing a high data rate, such as a so-called Firewire transmission format or a USB data format, is preferred as data transmission mode for transmitting data from the wave field synthesis module to a loudspeaker module. Data transfer rates of more than 100 megabits per second are advantageous.

The data stream transmitted from the wave field synthesis module 10 to a loudspeaker module thus is formatted correspondingly according to the data format chosen in the wave field synthesis module and provided with synchronization information provided in usual serial data formats. This synchronization information is extracted from the data stream by the individual loudspeaker modules and used to synchronize the individual loudspeaker modules with respect to their reproduction, i.e. ultimately to the analog-digital conversion for obtaining the analog loudspeaker signal and the sampling (re-sampling) provided for this purpose. The central wave field synthesis module works as a master, and all loudspeaker modules work as clients, wherein the individual data streams all obtain the same synchronization information from the central module 10 via the various transmission paths 16a-16e. This ensures that all loudspeaker modules work synchronously, namely synchronized with the master 10, which is important for the audio reproduction system so as not to suffer loss of audio quality, so that the synthesis signals calculated by the wave field synthesis module are not irradiated in temporally offset manner from the individual loudspeakers after corresponding audio rendering.

The concept described indeed provides significant flexibility with respect to a wave field synthesis system, which is scalable for various ways of application. But it still suffers from the problem that the central wave field synthesis module, which performs the actual main rendering, i.e. which calculates the individual synthesis signals for the loudspeakers depending on the positions of the virtual sources and depending on the loudspeaker positions, represents a "bottleneck" for the entire system. Although, in this system, the "post-rendering", i.e. the imposition of the synthesis signals with channel transmission functions, etc., is already performed in decentralized manner, and hence the necessary data transmission capacity between the central renderer module and the individual loudspeaker modules has already been reduced by selection of synthesis signals with less energy than a determined threshold energy, all virtual sources, however, still have to be rendered for all loudspeaker modules in a way, i.e. converted into synthesis signals, wherein the selection takes place only after rendering.

This means that the rendering still determines the overall capacity of the system. If the central rendering unit thus is capable of rendering 32 virtual sources at the same time, for example, i.e. to calculate the synthesis signals for these 32 virtual sources at the same time, serious capacity bottlenecks occur, if more than 32 sources are active at one time in one audio scene. For simple scenes this is sufficient. For more complex scenes, particularly with immersive sound impressions, i.e. for example when it is raining and many rain drops represent individual sources, it is immediately apparent that the capacity with a maximum of 32 sources will no longer suffice. A corresponding situation also exists if there is a large orchestra and it is desired to actually process every orchestral player or at least each instrument group as a source of its own at its own position. Here, 32 virtual sources may very quickly become too less.

Typically, in a known wave field synthesis concept, one uses a scene description in which the individual audio objects are defined together such that, using the data in the scene description and the audio data for the individual virtual sources, the complete scene can be rendered by a renderer or a multi-rendering arrangement. Here, it is exactly defined for each audio object, where the audio object has to begin and where the audio object has to end. Furthermore, for each audio object, the position of the virtual source at which that virtual source is to be, i.e. which is to entered into the wave field synthesis rendering means, is indicated exactly, so that the corresponding synthesis signals are generated for each loudspeaker. This results in the fact that, by superposition of the sound waves output from the individual loudspeakers as a reaction to the synthesis signals, an impression develops for a listener as if a sound source were positioned at a position in the reproduction room or outside the reproduction room, which is defined by the source position of the virtual source.

Typically, the capacities of the wave field synthesis system are limited. This leads to each renderer having limited computation capacity. Typically, a renderer is capable of processing 32 audio sources at the same time. Furthermore, a transmission path from the audio server to the renderer has limited transmission bandwidth, i.e. provides a maximum transfer rate in bits per second.

For simple scenes, in which e.g. only two virtual sources exist, if it is thought of a dialog, wherein a further virtual source is present in addition for a background noise, the processing capacity of the renderer, which can in fact process e.g. 32 sources at the same time, is not problematic. Furthermore, in this case, the transmission volume to a renderer is so small that the capacity of the transmission path is sufficient.

However, problems will occur when more complex scenes are to be reproduced, i.e. scenes having more than 32 virtual sources. In such a case, which for example occurs when to correctly reproduce a scene in the rain, or to naturally reproduce an applause scene, the maximum computation capacity of a renderer limited to 32 virtual sources quickly will no longer be sufficient. This is due to the fact that very many individual virtual sources exist, since, e.g. in an audience, every listener who is applauding may in principle be understood as a virtual source of its own at a virtual position of its own. In order to deal with this limitation, several possibilities exist. Thus, one possibility is to take care, already when creating the scene description, that a renderer never has to process 32 audio objects at the same time.

Particularly when thinking of a capacity increase of the wave field synthesis processing, i.e. when a great number of virtual sources is to be rendered by individual or several renderer modules, it will at some time come to capacity bottlenecks. This is due to the fact that a typical renderer can only process a certain maximum number of virtual sources at the same time. This number may for example be 32. The maximum processing capacity of a renderer is, however, not the only bottleneck of a system. If it is to process e.g. 32 virtual sources at the same time, a renderer also has to be provided with the corresponding audio files for the 32 virtual sources at the same time. Typically, a renderer has an input buffer, which indeed somewhat straightens out the requirements for the data transmission, but which also has to be filled correspondingly quickly, in particular when the renderer is processing very many sources at the same time, i.e. when very much data is taken from the buffer.

If the data transmission infrastructure is designed so that it can no longer catch up with the data delivery, the renderer in a way runs out of data for rendering. The renderer could still somewhat compensate for such a situation by simply repeating the last data until new data arrives. However, this is intensive in the data management and may lead to audible artifacts. These artifacts will be worse if the virtual source is a source with deterministic information, such as voice, music, etc. This repetition of present data will be less critical if the virtual source is a noise source, or generally stated a sound source. But also a discrimination here is problematic, particularly in the context that such "additional" tasks for a renderer actually would have to be performed exactly when the renderer is already running at its maximum utilization (workload) limit anyway, which after all has been the cause for "running out" of audio data to be rendered.

SUMMARY OF THE INVENTION

According to an embodiment, an apparatus for storing audio files for an audio piece in a storage device with a writer and a reader, wherein the audio piece is to be rendered by a renderer of a wave field synthesis system, wherein the audio piece has several scenes, wherein a scene description is provided for each scene, and wherein a scene defines a temporal sequence of audio objects of the scene, wherein an audio object has information on a virtual source and an identification for an audio file associated with the audio object, may have: an examiner for examining the scene description and for determining a first scene demanding a higher processing capacity of the wave field synthesis system (3) than a second scene; and a controller for controlling the writer so that audio files being identified by the scene description of the first scene are written on the storage device so that the reader can read out the audio files for the first scene more quickly than if the audio files for the first scene are randomly stored on the storage device.

According to another embodiment, a method for storing audio files for an audio piece in a storage device with a writer and a reader, wherein the audio piece is to be rendered by a renderer of a wave field synthesis system, wherein the audio piece has several scenes, wherein a scene description is provided for each scene, and wherein a scene defines a temporal sequence of audio objects of the scene, wherein an audio object has information on a virtual source and an identification for an audio file associated with the audio object, may have the steps of: examining the scene description and determining a first scene demanding a higher processing capacity of the wave field synthesis system than a second scene; and controlling the writer so that audio files being identified by the scene description of the first scene are written on the storage device so that the reader can read out the audio files for the first scene more quickly than if the audio files for the first scene are randomly stored on the storage device.

According to another embodiment, a computer program may have program code for performing, when the computer program is executed on a computer, a method for storing audio files for an audio piece in a storage device with a writer and a reader, wherein the audio piece is to be rendered by a renderer of a wave field synthesis system, wherein the audio piece has several scenes, wherein a scene description is provided for each scene, and wherein a scene defines a temporal sequence of audio objects of the scene, wherein an audio object has information on a virtual source and an identification for an audio file associated with the audio object, wherein the method may have the steps of: examining the scene description and determining a first scene demanding a higher processing capacity of the wave field synthesis system than a second scene; and controlling the writer so that audio files being identified by the scene description of the first scene are written on the storage device so that the reader can read out the audio files for the first scene more quickly than if the audio files for the first scene are randomly stored on the storage device.

The present invention is based on the finding that efficient data organization is decisive, so that a renderer is supplied with enough data even when it is working at its utilization limit. Typically, the data with which the renderer is supplied are read out from a storage device, such as a hard disk of a PC or a workstation.

It has been found out, however, that the access times to the audio files substantially depend on how the audio files are stored on the storage medium in the storage device. Continuous jumping of the write/read head of the hard disk leads to the fact that the readout performance of the memory device decreases so sharply that, in certain situations, it can no longer be ensured that a renderer is supplied with sufficient data. Furthermore, it has been found out that this may particularly be the case in a scene in which the renderer is working at a utilization limit or close to its utilization limit anyway. In contrast, the situation is less problematic when the renderer is not working that close to its utilization limit in another scene and hence also does not need that much data. Hence, jumps of the write/read head of the memory device are well acceptable here.

According to the invention, in a way as a preparation for a wave field synthesis reproduction, therefore efficient storage of the audio files is done, wherein a cross-scene memory optimization is applied. As such, the scene descriptions are examined to find out a first scene demanding higher processing capacity of the wave field synthesis system than another, second, scene. Then, the writing means of the storage device is controlled so that it writes the audio files identified by the scene description of the first scene onto the storage device so that a reading means of the storage device can read out the audio files for the first scene more quickly than if the audio files for the first scene are stored in purely random manner on the storage device. In contrast to a normal hard disk environment, in which files are stored on the hard disk where the read head currently is, i.e. in some random manner, the audio files for the scene strongly loading the wave field synthesis system are written in optimized manner according to the invention, which of course leads to the audio files for other scenes not being written in optimum manner. This is not problematic, however, since in other scenes a storage device may have more access time, because the data transfer rate needed for the other scene is not that high anyway, because fewer virtual sources are to be processed in parallel.

In a preferred embodiment of the present invention, particularly for audio files used in several scenes, storage of the audio files on the storage device is done so that the memory access for the scene entailing the highest utilization of the wave field synthesis system is written in optimum manner, while accepting many jumps for other scenes accessing the same audio file.

In a storage device with several individual storage media that can be used in parallel, such as a RAID array, it is preferred to store audio files to be used in parallel on parallel individual storage media, so that they can be read out at maximum speed for the scene in which there is a capacity problem anyway, whereas for other scenes audio files to be processed at the same time are not on separate disks but e.g. on one and the same disk, which is, however, not critical with respect to the utilization, which is not that high there anyway.

BRIEF DESCRIPTION OF THE DRAWINGS

Embodiments of the present invention will be detailed subsequently referring to the appended drawings, in which:

FIG. 1B shows an exemplary audio piece with scenes of different wave field synthesis system utilization.

FIG. 1C shows a first example for optimized cross-scene storage.

FIG. 1D shows a second example for optimized cross-scene storage.

FIG. 2 shows an exemplary audio object.

FIG. 3 shows an exemplary scene description.

DETAILED DESCRIPTION OF PREFERRED EMBODIMENTS

Figure 1A:
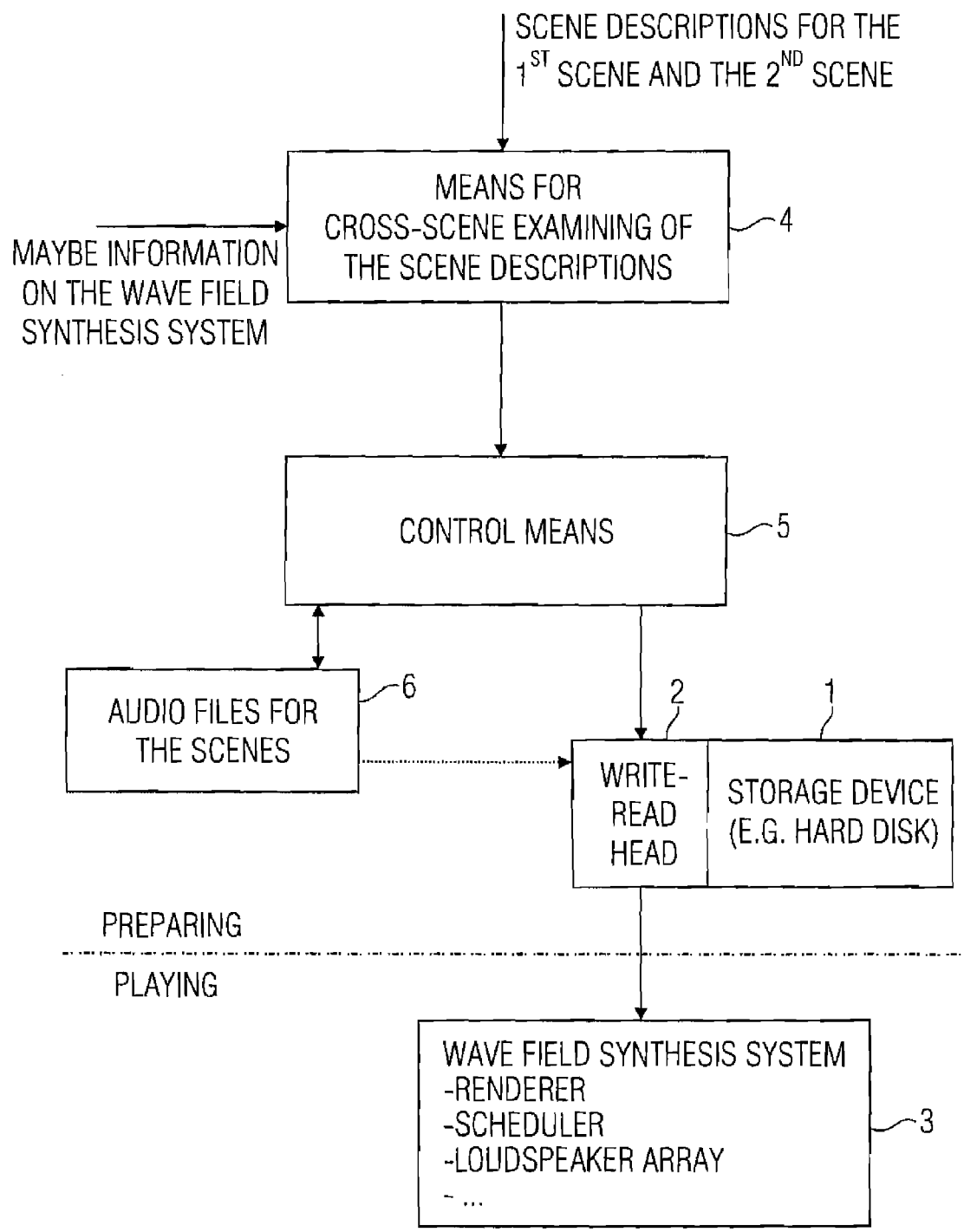
FIG. 1A is a block circuit diagram of the inventive concept for storing audio files.

FIGS. 1A-1D show an inventive apparatus for storing audio files for an audio piece in a storage device with a writing means and a reading means, formed as a common write/read head 2 in the embodiment shown in FIG. 1A. The audio piece is to be rendered by a renderer of a wave field synthesis system 3. In particular, the audio piece includes several scenes, with a scene description of its own being provided for each scene, and with a scene comprising a temporal sequence of audio objects of the scene. In particular, an audio object includes information on a virtual source and an identification for an audio file associated with the audio object.

According to the invention, a means 4 for examining the scene descriptions and for determining a first scene demanding higher processing capacity of the wave field synthesis system than a second scene is provided. To this end, as it is shown in FIG. 1A, the means 4 may be supplied with information on the wave field synthesis system 3, and particularly on the current utilization of the renderer in the wave field synthesis system. The means 4 controls a control means 5. The control means 5 is formed to control the write/read head 2 so that audio files identified by the scene description of the first scene, i.e. audio files for the scene with higher utilization, are written on the storage device 1 so that the reading means 2 can read the audio files for the first scene out more quickly than if the audio files for the first scene had been stored randomly on the storage device. The audio files preferably come from a further storage device, which may be a CD or DVD, and are either directly written onto the storage device via the control means or are supplied to the write/read head 2 of the storage device 1, of course in the right order, as it has been determined by the control means 5, in controlled manner by the control means directly from the additional memory 6.

In particular, the control means 5 is formed to write to the storage device 1, which e.g. is a hard disk, so that no fractioning occurs in any case, i.e. that all audio files are written continuously. Furthermore, the control means is formed to write audio files at certain locations in the hard disk. As such, the storing, i.e. the actual writing of the physical hard disk, is no longer left to the hard disk controller alone or to chance, like in conventional hard disks. Instead, the control means 5 is formed to control the write/read head 2 of the storage device 1 exactly so that audio files are stored in a certain order and arrangement on the storage device. With this, it is ensured that, when the wave field synthesis system is to play an audio piece, the read head can read out as quickly as possible, at least for the scenes in which the wave field synthesis system is working at its utilization limit anyway, i.e. e.g. may read one audio file after the other along a track without jumps occurring therebetween and supply same to the wave field synthesis system 3. In contrast, for other scenes, as it will still be described with reference to FIG. 1D, jumps are accepted, which is, however, not that serious for these scenes, since the data to be transmitted to the renderer are not that voluminous anyway.

At this point, it is to be pointed out that, due to the inherent dynamics of audio pieces particularly in demanding audio scenes, as they are to be processed according to the invention, the utilization of the wave field synthesis system is not constant at all. Instead, the utilization profile will be characterized by extremely high dynamics. As such, there will be scenes or portions in scenes in which the utilization is very low, while immediately afterwards the utilization may at once approach the maximum limit. Such a situation can be imagined well when a piece of music by an instrument (only one source) dies away and then the applause (very many different sources) of the audience starts immediately.

According to the invention, the audio files are stored in optimized and cross-scene manner. To this end, it is examined which audio files are needed at all, when a scene with high utilization is played, in order to then store exactly these audio files in optimized manner.

As shown in FIG. 1A, a wave field synthesis system 3 includes a renderer or several renderer modules as central element. The renderers are typically controlled by a scheduler, which is preferably formed to generate the data streams for the renderers using possibly provided audio objects manipulations. Thus, the scheduler is responsible for quickly reading out the data from the storage device 1 and supplying same to the downstream renderer, which then generates, from the audio files, synthesis signals supplied to the individual loudspeakers in the loudspeaker array.

The inventive storing of the audio files in cross-scene, optimized manner thus serves for preparation of the actual wave field synthesis rendering, also referred to as "playing" in FIG. 1A. The inventive cross-scene, optimized storage thus serves for the fact that quick data readout may take place when playing, which is so quick that at least the memory interface will not be the bottleneck of the wave field synthesis processing.

FIG. 1B shows an exemplary audio piece with a first scene and a second scene, wherein in the first scene four sources and/or four audio files AD1, AD2, AD3, AD4 must be rendered in parallel, wherein no more than three audio files must be rendered in parallel in the second scene, namely AD6, AD7 and AD1.

According to the invention, on the basis of FIG. 1C, memory optimization formed for several parallel disks will be illustrated subsequently. As such, it is taken as a priority that the audio files of the first scene are stored in optimum manner, which leads to the audio files AD1, AD2 being stored on the disk 1 and the audio files AD3, AD4 on the disk 2. As can be seen from FIG. 1C, this storage is disadvantageous for the second scene, since AD1 and AD7 are needed there at the same time, because these two audio files are rendered in parallel to each other. Nevertheless, both files are stored on the same disk 1 and further still separated from each other by the audio file AD2. For reading out the audio files for the second scene, the hard disk will therefore have to make some jumps and also cannot benefit from the parallel arrangement of disk 1 and disk 2. But this is also uncritical, since the data requirement in the second scene is lower than in the first scene anyway, because the utilization of the wave field synthesis system in the second scene is lower than in the first scene.

FIG. 1D shows an arrangement of the audio files on a track 7 on a storage medium, such as a hard disk. FIG. 1D exemplarily shows a serial arrangement on a single storage medium as opposed to the parallel storage medium of FIG. 1C. As such, it can be seen that the audio files of the first scene are stored successively, so that a read head does not have to jump to read the audio files of the first scene. This leads to a very quick data provision of the audio files AD1 to AD4.

For reading the audio files of the second scene, however, several jumps are needed. Thus, the read head of the storage device has to jump to the audio file AD2 after reading the audio file AD5, to then jump back to the audio file AD6 after the audio file AD2 has been read. The situation also is similar when the audio file AD1 has to be read after the audio file AD7.

As such, it can be seen that, in the embodiment shown in FIG. 1D, no jumps of the read head are needed whatsoever for reading the first scene, whereas for reading the second scene already four jumps of the read head are needed, which slow the access to the data in the storage device, but which is substantially less critical for the second scene than for the first scene, in which it is of great importance that the data is read out smoothly, so that the renderer does not run out of the data for rendering the first scene.

According to the invention, the fact that the data organization is decisive for the efficient data output is taken into account. The necessary transfer rate for feeding a renderer cannot be guaranteed in many embodiments from media from CD or DVD. Hence, a hard-disk-based management is necessary. According to the invention, optimization of the memory layout is done for complex scenes, in order to guarantee the observation of the time requirements.

According to the invention, efficient delivery of the audio and meta data on the one hand and efficient data organization on the other hand thus is achieved. As such, the playing order of the audio data can be fixed via the meta data corresponding to the object-oriented scene description. If the playing order is known, the access to the audio data when playing can be optimized. The computer does not have to "search" for the audio data at arbitrary locations on the hard disk or other storage media any more, but is capable of reading the audio data consecutively, without the read access necessitating great jumps in the memory. By the reduction of the effort in the read access to the audio data, it is possible to utilize the resources more efficiently and thus process more audio objects at the same time in real time.

In the data organization, it is preferred to use a central database. The consistency of the audio and meta data is guaranteed by the central organization. Furthermore, the employment of a database considerably facilitates the production of wave field synthesis scenes. As such, it is preferred to employ a database allowing for a search mechanism for finding certain data in the database. With this, a cross-scene reusability of audio objects is created. Audio data may for example be used equally in several scenes, without having to be imported again when creating a new scene. Furthermore, with the aid of the database, the versioning of audio and meta data can be realized. This permits the user to obtain the access to older versions of their scene description, which also facilitates the production process.

At this point, it is to be pointed out that the storage device does not necessarily have to be a central database, but may be embodied as a purely normal file server. It is preferred, however, to employ an audio database, which particularly is of advantage if certain audio material from various different scenes is used. As such, the audio database knows all scenes and knows which scenes use which audio material and when. Furthermore, the audio database has access to the audio data and may determine the storage sequence of the audio data on the hard disk. Moreover, the audio database may create an optimum cross-scene storage order for the audio data. Finally, the audio database may also discover bottlenecks and react thereto correspondingly when storing the audio data.

According to the invention, this may alternatively also be realized by storing all scene files in a central location and realizing a program reading out all scene files and deriving therefrom the storage order of the audio files on the server. A database, however, forces the central storage of the scene files preferred for the optimization of the order of storage of the audio files.

According to the invention, temporal and spatial arrangement of audio sources and optimization of the storage order of the audio files on the storage medium resulting therefrom are performed. To this end, a cross-scene optimization of the data is used, which preferably uses central storage and management of scenes.

Subsequently, with reference to FIG. 2, it is pointed to information an audio object advantageously should have. Thus, an audio object is to specify the audio file that in a way represents the audio content of a virtual source. Thus, the audio object, however, does not have to include the audio file, but may have an index referring to a defined location in a database at which the actual audio file is stored.

Furthermore, an audio object preferably includes an identification of the virtual source, which may for example be a source number or a meaningful file name, etc. Furthermore, in the present invention, the audio object specifies a time span for the beginning and/or the end of the virtual source, i.e. the audio file. If only a time span for the beginning is specified, this means that the actual starting point of the rendering of this file may be changed by the renderer within the time span. If additionally a time span for the end is given, this means that the end may also be varied within the time span, which will altogether lead to a variation of the audio file also with respect to its length, depending on the implementation. Any implementations are possible, such as also a definition of the start/end time of an audio file so that the starting point is indeed allowed to be shifted, but that the length must not be changed in any case, so that the end of the audio file thus is also shifted automatically. For noise, in particular, it is however preferred to also keep the end variable, because it typically is not problematic whether e.g. a sound of wind will start a little sooner or later or end a little sooner or later. Further specifications are possible and/or desired depending on the implementation, such as a specification that the starting point is indeed allowed to be varied, but not the end point, etc.

Preferably, an audio object further includes a location span for the position. Thus, for certain audio objects, it will not be important whether they come from e.g. front left or front center or are shifted by a (small) angle with respect to a reference point in the reproduction room. However, there are also audio objects, particularly again from the noise region, as it has been explained, which can be positioned at any arbitrary location and thus have a maximum location span, which may for example be specified by a code for "arbitrary" or by no code (implicitly) in the audio object.

An audio object may include further information, such as an indication of the type of virtual source, i.e. whether the virtual source has to be a point source for sound waves or has to be a source for plane waves or has to be a source producing sources of arbitrary wave front, as far as the renderer modules are capable of processing such information.

FIG. 3 exemplarily shows a schematic illustration of a scene description in which the temporal sequence of various audio objects AO1, . . . , AOn+1 is illustrated. In particular, it is pointed to the audio object AO3, for which a time span is defined, as drawn in FIG. 3. Thus, both the starting point and the end point of the audio object AO3 in FIG. 3 can be shifted by the time span. The definition of the audio object AO3, however, is that the length must not be changed, which is, however, variably adjustable from audio object to audio object.

Thus, it can be seen that by shifting the audio object AO3 in positive temporal direction, a situation may be reached in which the audio object AO3 does not begin until after the audio object AO2. If both audio objects are played on the same renderer, a short overlap 20, which might otherwise occur, can be avoided by this measure. If the audio object AO3 already were the audio object lying above the capacity of the known renderer, due to already all further audio objects to be processed on the renderer, such as audio objects AO2 and AO1, complete suppression of the audio object AO3 would occur without the present invention, although the time span 20 was only very small. According to the invention, the audio object AO3 is shifted by the audio object manipulation means 3 so that no capacity excess and thus also no suppression of the audio object AO3 takes place any more.

In the preferred embodiment of the present invention, a scene description having relative indications is used. Thus, the flexibility is increased by the beginning of the audio object AO2 no longer being given in an absolute point in time, but in a relative period of time with respect to the audio object AO1. Correspondingly, a relative description of the location indications is preferred, i.e. not the fact that an audio object is to be arranged at a certain position xy in the reproduction room, but is e.g. offset to another audio object or to a reference object by a vector.

Thereby, the time span information and/or location span information may be accommodated very efficiently, namely simply by the time span being fixed so that it expresses that the audio object AO3 may begin in a period of time between two minutes and two minutes and twenty seconds after the start of the audio object AO1.

Such a relative definition of the space and time conditions leads to a database-efficient representation in form of constraints, as it is described e.g. in "Modeling Output Constraints in Multimedia Database Systems", T. Heimrich, 1th International Multimedia Modelling Conference, IEEE, Jan. 2, 2005 to Jan. 14, 2005, Melbourne. Here, the use of constraints in database systems is illustrated, to define consistent database states. In particular, temporal constraints are described using Allen relations, and spatial constraints using spatial relations. Herefrom, favorable output constraints can be defined for synchronization purposes. Such output constraints include a temporal or spatial condition between the objects, a reaction in case of a violation of a constraint, and a checking time, i.e. when such a constraint must be checked.

In the preferred embodiment of the present invention, the spatial/temporal output objects of each scene are modeled relatively to each other. The audio object manipulation means achieves translation of these relative and variable definitions into an absolute spatial and temporal order. This order represents the output schedule obtained at the output 6a of the system shown in FIGS. 1A-1D and defining how particularly the renderer module in the wave field synthesis system is addressed. The schedule thus is an output plan arranged in the audio data corresponding to the output conditions.

Figure 4:
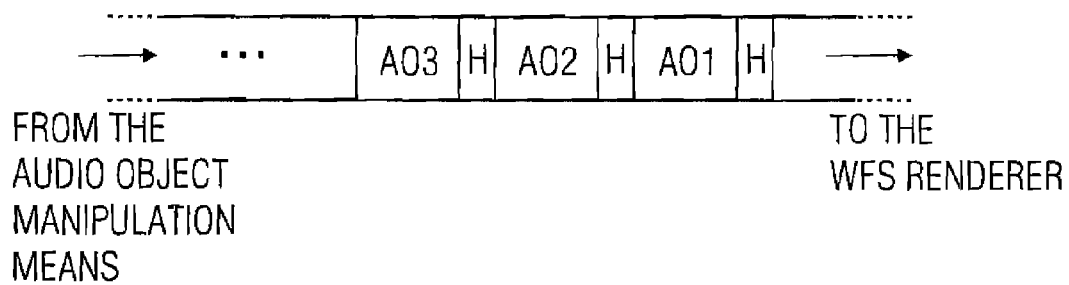
FIG. 4 shows a bit stream, in which a header having the current time data and position data is associated with each audio object.

Subsequently, on the basis of FIG. 4, a preferred embodiment of such an output schedule will be set forth. In particular, FIG. 4 shows a data stream, which is transmitted from left to right according to FIG. 4, i.e. from the audio object manipulation means 3 of Figs. 1A-1D to one or more wave field synthesis renderers of the wave field system 0 of Figs. 1A-1D. In particular, the data stream includes, for each audio object in the embodiment shown in FIG. 4, at first a header H, in which the position information and the time information are, and a downstream audio file for the special audio object, which is designated with AO1 for the first audio object, AO2 for the second audio object, etc. in FIG. 4.

A wave field synthesis renderer then obtains the data stream and recognizes, e.g. from present and fixedly agreed-upon synchronization information, that now a header comes. On the basis of further synchronization information, the renderer then recognizes that the header now is over. Alternatively, also a fixed length in bits can be agreed for each header.

Following the reception of the header, the audio renderer in the preferred embodiment of the present invention shown in FIG. 4 automatically knows that the subsequent audio file, i.e. e.g. AO1, belongs to the audio object, i.e. to the source position identified in the header.

FIG. 4 shows serial data transmission to a wave field synthesis renderer. Of course, several audio objects are played in a renderer at the same time. For this reason, the renderer needs an input buffer preceded by a data stream reading means to parse the data stream. The data stream reading means will then interpret the header and store the accompanying audio files correspondingly, so that the renderer then reads out the correct audio file and the correct source position from the input buffer, when it is an audio object's turn to render. Other data for the data stream is of course possible. Separate transmission of both the time/location information and of the actual audio data may also be used. The combined transmission illustrated in FIG. 4 is preferred, however, since it eliminates data consistency problems by concatenation of the position/time information with the audio file, since it is ensured that the renderer also has the right source position for audio data and is not still rendering e.g. audio files of an earlier source, but is already using position information of the new source for rendering.

The present invention thus is based on an object-oriented approach, i.e. that the individual virtual sources are understood as objects characterized by an audio object and a virtual position in space and maybe by the type of source, i.e. whether it is to be a point source for sound waves or a source for plane waves or a source for sources of other shape.

As it has been set forth, the calculation of the wave fields is very computation-time intensive and bound to the capacities of the hardware used, such as soundcards and computers, in connection with the efficiency of the computation algorithms. Even the best-equipped PC-based solution thus quickly reaches its limits in the calculation of the wave field synthesis, when many demanding sound events are to be represented at the same time. Thus, the capacity limit of the software and hardware used gives the limitation with respect to the number of virtual sources in mixing and reproduction.

Figure 6:
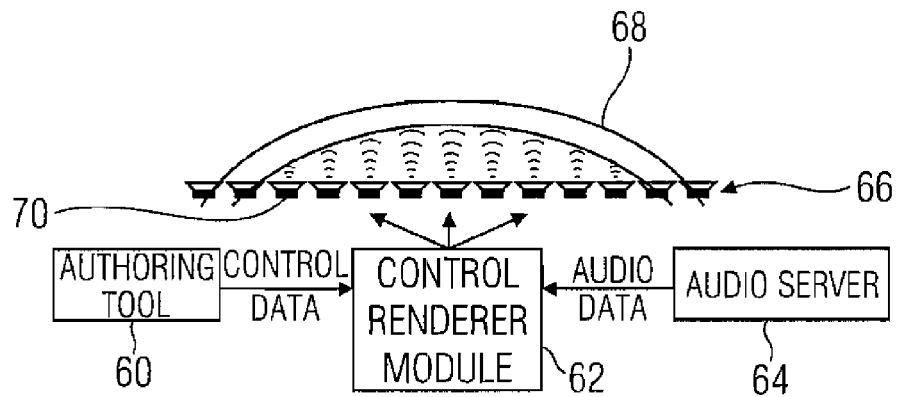
FIG. 6 is a schematic illustration of a known wave field synthesis concept.
Figure 7:
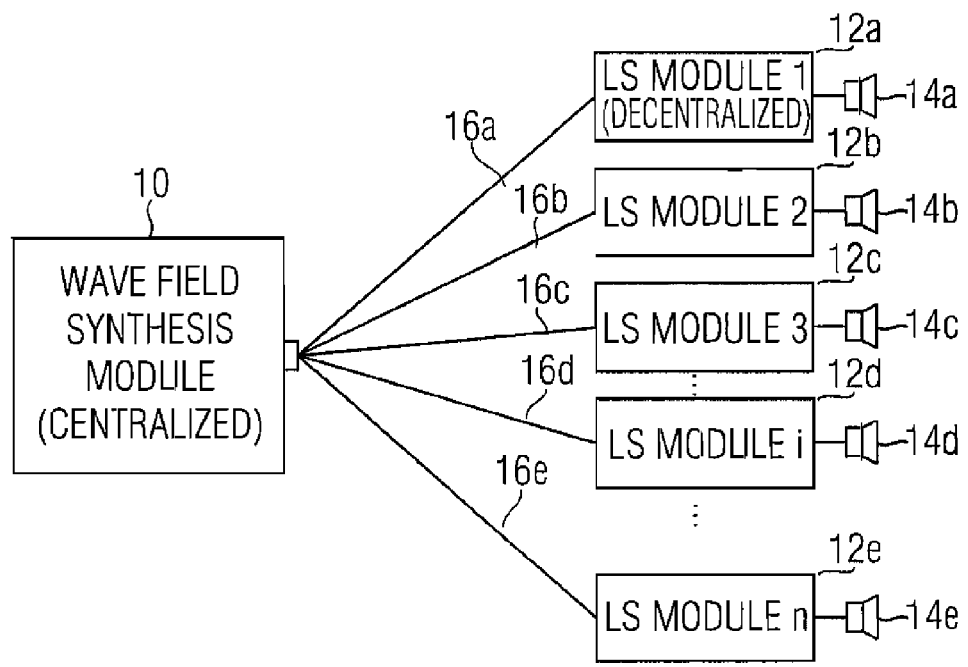
FIG. 7 is a further illustration of a known wave field synthesis concept.

FIG. 6 shows such a known wave field synthesis concept limited in its capacity, which includes an authoring tool 60, a control renderer module 62, and an audio server 64, wherein the control renderer module is formed to provide a loudspeaker array 66 with data, so that the loudspeaker array 66 generates a desired wave front 68 by superposition of the individual waves of the individual loudspeakers 70. The authoring tool 60 enables the user to create and edit scenes and control the wave-field-synthesis-based system. A scene thus consists of both information on the individual virtual audio sources and of the audio data. The properties of the audio sources and the references to the audio data are stored in an XML scene file. The audio data itself is filed on the audio server 64 and transmitted to the renderer module therefrom. At the same time, the renderer module obtains the control data from the authoring tool, so that the control renderer module 62, which is embodied in centralized manner, may generate the synthesis signals for the individual loudspeakers. The concept shown in FIG. 6 is described in "Authoring System for Wave Field Synthesis", F. Melchior, T. Röder, S. Brix, S. Wabnik and C. Riegel, AES Convention Paper, 115th AES convention, Oct. 10, 2003, New York.

If this wave field synthesis system is operated with several renderer modules, each renderer is supplied with the same audio data, no matter if the renderer needs this data for the reproduction due to the limited number of loudspeakers associated with the same or not. Since each of the current computers is capable of calculating 32 audio sources, this represents the limit for the system. On the other hand, the number of the sources that can be rendered in the overall system is to be increased significantly in efficient manner. This is one of the substantial prerequisites for complex applications, such as movies, scenes with immersive atmospheres, such as rain or applause, or other complex audio scenes.

According to the invention, a reduction of redundant data transmission processes and data processing processes is achieved in a wave field synthesis multi-renderer system, which leads to an increase in computation capacity and/or the number of audio sources computable at the same time.

For the reduction of the redundant transmission and processing of audio and meta data to the individual renderer of the multi-renderer system, the audio server is extended by the data output means, which is capable of determining which renderer needs which audio and meta data. The data output means, maybe assisted by the data manager, needs several pieces of information, in a preferred embodiment. This information at first is the audio data, then time and position data of the sources, and finally the configuration of the renderers, i.e. information about the connected loudspeakers and their positions, as well as their capacity. With the aid of data management techniques and the definition of output conditions, an output schedule is produced by the data output means with a temporal and spatial arrangement of the audio objects. From the spatial arrangement, the temporal schedule and the renderer configuration, the data management module then calculates which sources are relevant for which renderers at a certain time instant.

Figure 5:
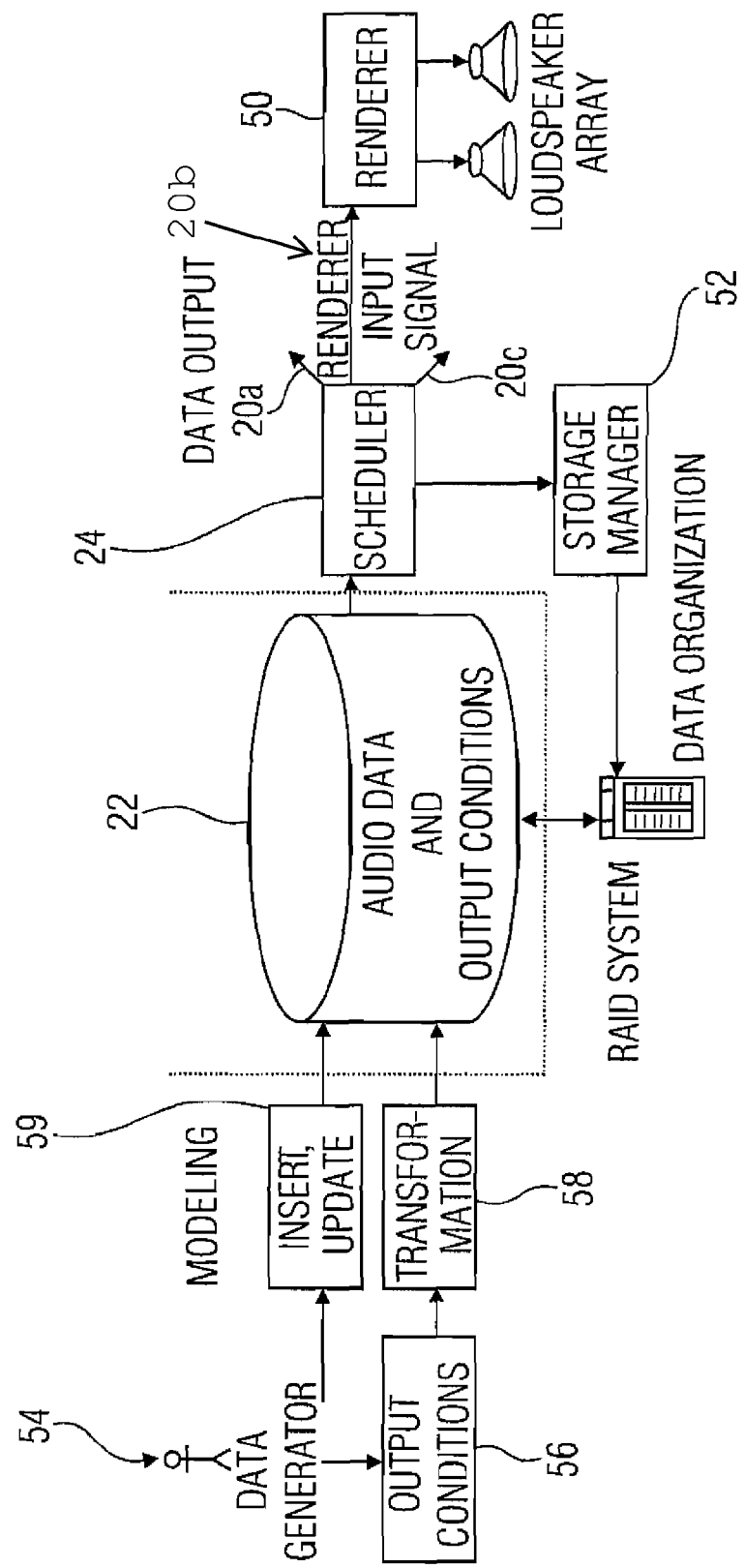
FIG. 5 shows an embedding of the inventive concept into an overall wave field synthesis system.

A preferred overall concept is illustrated in FIG. 5. The database 22 is supplemented by the data output means 24 on the output side, wherein the data output means is also referred to as scheduler. This scheduler then generates the renderer input signals for the various renderers 50 at its outputs 20a, 20b, 20c, so that the corresponding loudspeakers of the loudspeaker arrays are supplied.

Preferably, the scheduler 24 also is assisted by a storage manager 52, in order to configure the database 22 by means of a RAID system and corresponding data organization defaults.

On the input side, there is a data generator 54, which may for example be a sound master or an audio engineer who is to model or describe an audio scene in object-oriented manner. Here, it gives a scene description including corresponding output conditions 56, which are then stored together with audio data in the database 22 after a transformation 58, if necessary. The audio data may be manipulated and updated by means of an insert/update tool 59.

Depending on the conditions, the inventive method may be implemented in hardware or in software. The implementation may be on a digital storage medium, particularly a floppy disk or CD, with electronically readable control signals capable of cooperating with a programmable computer system so that the method is executed. In general, the invention thus also consists in a computer program product with program code stored on a machine-readable carrier for performing the method, when the computer program product is executed on a computer. In other words, the invention may thus also be realized as a computer program with program code for performing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for storing audio files for an audio piece in a storage device with a writer and a reader, wherein the audio piece is to be rendered by a renderer of a wave field synthesis system, wherein the audio piece comprises several scenes, wherein a scene description is provided for each scene, and wherein a scene defines a temporal sequence of audio objects of the scene, wherein an audio object comprises information on a virtual source and an identification for an audio file associated with the audio object, comprising:
   an examiner for examining the scene description and for determining a first scene demanding a higher processing capacity of the wave field synthesis system (3) than a second scene; and
   a controller for controlling the writer so that audio files being identified by the scene description of the first scene are written on the storage device so that the reader can read out the audio files for the first scene more quickly than if the audio files for the first scene are randomly stored on the storage device.

2. The apparatus according to claim 1, wherein an audio object of the first scene and an audio object of the second scene identify the same audio file, and
   wherein the controller is formed to control the writer so that the audio file is stored in the storage device so that the reader can read the audio file, when reading the audio file identified in the first scene, with less access time than if the audio file is read when reading the audio files for the second scene.

3. The apparatus according to claim 2, wherein the storage device comprises a track, along which the reader moves, and
   wherein the controller is formed to control the writer so that the audio file is stored in the track immediately in front of or behind another audio file identifying an audio object to be rendered by the renderer in parallel to the one audio object identifying the audio file.

4. The apparatus according to claim 1, wherein the storage device comprises a track, along which the reader moves, and
   wherein the controller is formed to control the writer so that audio files of the first scene are written along the track.

5. The apparatus according to claim 4, wherein the controller is formed to control the writer so that the audio files of the first scene are stored along the track according to a temporal order of the occurrence of audio objects of the first scene identifying the audio files.

6. The apparatus according to claim 1, wherein the storage device is a parallel storage device with single access media, wherein the controller is formed to control the writer so that audio files of the first scene, which are to be rendered in parallel by the renderer, are stored on different single access media.

7. The apparatus according to claim 1, wherein the examiner is formed to determine, as first scene, the scene comprising a greater number of audio objects to be rendered at the same time by a renderer than another scene.

8. The apparatus according to claim 1, wherein the examiner is formed to determine a scene as first scene only if a scene-induced utilization of the wave field synthesis system reaches a predetermined proportion of the maximum utilization.

9. The apparatus according to claim 1, wherein the controller is formed to control the writer so that the audio files of the second scene are stored at locations of the storage device still remaining free, after the audio files of the first scene are stored on the storage device.

10. The apparatus according to claim 1, wherein the storage device is a hard disk with one storage disk or several storage disks, wherein a write/read head is provided for each storage disk.

11. The apparatus according to claim 1, wherein the writer and the reader are formed as one and the same physical component.

12. The apparatus according to claim 1, wherein the controller is formed to control the writer so that audio files identified by audio objects of the first scene are written continuously onto the storage device, without the reader having to jump when reading the audio files of the first scene.

13. A method for storing audio files for an audio piece in a storage device with a writer and a reader, wherein the audio piece is to be rendered by a renderer of a wave field synthesis system, wherein the audio piece comprises several scenes, wherein a scene description is provided for each scene, and wherein a scene defines a temporal sequence of audio objects of the scene, wherein an audio object comprises information on a virtual source and an identification for an audio file associated with the audio object, comprising:
   examining the scene description and determining a first scene demanding a higher processing capacity of the wave field synthesis system than a second scene; and
   controlling the writer so that audio files being identified by the scene description of the first scene are written on the storage device so that the reader can read out the audio files for the first scene more quickly than if the audio files for the first scene are randomly stored on the storage device.

14. A tangible computer readable medium storing a computer program with program code for performing, when the computer program is executed on a computer, a method for storing audio files for an audio piece in a storage device with a writer and a reader, wherein the audio piece is to be rendered by a renderer of a wave field synthesis system, wherein the audio piece comprises several scenes, wherein a scene description is provided for each scene, and wherein a scene defines a temporal sequence of audio objects of the scene, wherein an audio object comprises information on a virtual source and an identification for an audio file associated with the audio object, the method comprising:

examining the scene description and determining a first scene demanding a higher processing capacity of the wave field synthesis system than a second scene; and controlling the writer so that audio files being identified by the scene description of the first scene are written on the storage device so that the reader can read out the audio files for the first scene more quickly than if the audio files for the first scene are randomly stored on the storage device.

\* \* \* \* \*